B. FERGUSON.
SIGNAL.
APPLICATION FILED JAN. 8, 1910.
998,488.
Patented July 18, 1911.
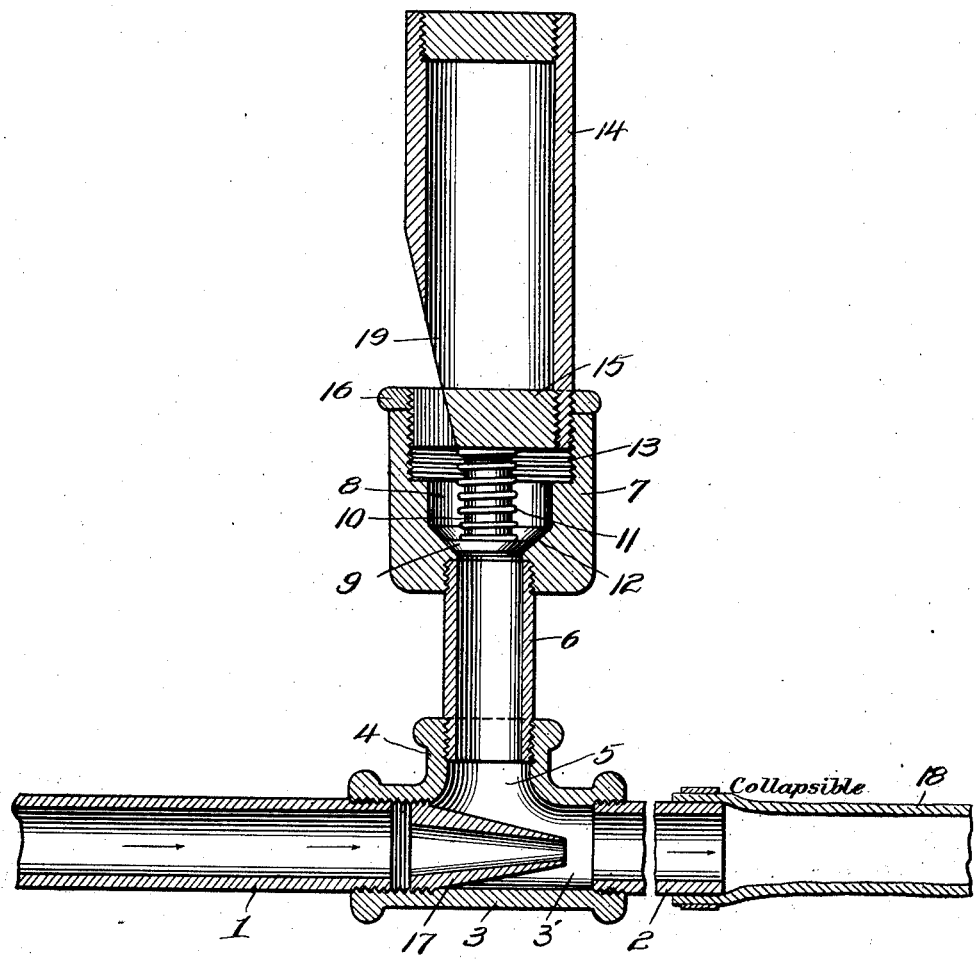
Witnesses
Inventor
Barrington Ferguson.
By Victor J. Evans
Attorney

UNITED STATES PATENT OFFICE.

BARRINGTON FERGUSON, OF FERNIE, BRITISH COLUMBIA, CANADA.

SIGNAL.

998,488.   Specification of Letters Patent.   Patented July 18, 1911.

Application filed January 3, 1910. Serial No. 537,007.

*To all whom it may concern:*

Be it known that I, BARRINGTON FERGUSON, a subject of the King of Great Britain, residing at Fernie, in the Province of British Columbia, Dominion of Canada, have invented new and useful Improvements in Signals, of which the following is a specification.

This invention relates to signals and particularly to one which will be extremely desirable for use in mines or other places where gaseous atmospheric conditions exist, the object of the invention being to provide a signal whereby the alarm means can be operated, by compressed air which latter is normally allowed to escape into the mine to furnish a perfect ventilation.

Other objects and advantages will be apparent as the nature of the invention is better disclosed and it will be understood that changes within the scope of the claims can be made without departing from the spirit of the invention.

In the drawing the figure illustrates a sectional elevation of my improved signal.

The signal as preferably constructed by me embodies a pipe line which is preferably formed of sections 1 and 2 which are operatively connected with a coupling member 3. This member has formed integrally therewith a neck or nipple 4 whose bore 5 extends at right angles to the bore 3' of the coupling member. The nipple or neck supports a short pipe section 6 upon which is mounted a member 7.

The member 7 is formed with a combined valve chamber and port 8 in which is mounted a vertically movable valve 9. This valve carries a stem 10 which is surrounded by a helical spring 11 which is operatively positioned in the valve chamber or port to exert its pressure or tension against the valve 9 to hold the same normally against the seat 12. The member 7, immediately above the port or chamber 8 is formed with a threaded bore 13 which receives the lower threaded end of a cup or bell 14. The said cup or bell is provided one end with an adjustable plug 15. The lower threaded end of the bell or cup has mounted thereon a jam nut 16 which is adapted to be frictionally engaged with the member 7 whereby the cup or bell can be held in its adjusted position.

The member 3 is provided with an adjustable nozzle 17 whose bore is tapered and is disposed in line with the sections 1 and 2 of the pipe line. The idea of the nozzle is, if through time, the hose should become interiorly rough by the continuous flow of air, this would increase the friction and probably raise the valve. The nozzle is advanced past the bore 5 and is tapered small toward such end and by this it increases the speed of the air and will overcome the extra pressure that may come on the valve if the hose becomes interiorly rough as above described. The section 2 of the pipe line is provided with a flexible hose 18 from which the air in the pipe line may escape normally and discharge if desired directly into the mine to form a thorough and perfect ventilation. In operation of the signal compressed air is admitted to the section 1 of the pipe line, the said air being free to travel throughout the entire length of the line and to be effectively conveyed across the bore 5 of the coupling member. Should it be desired to operate the signal the flexible hose 18 may be pinched to bring its walls together whereby the escape of air by way of the hose is checked. After this operation the air will be free to pass immediately through the bore 5 of the coupling member and then discharged with sufficient pressure or force against the valve 9 to move the same from its seat, thus allowing the air to escape from the port or escape passage 19 of the bell or cup.

A signal as disclosed herein is extremely simple in construction and is practically indestructible and will not suffer material injury in the fall of the walls of a mine.

I claim:—

1. A signal comprising a fluid controlled sounding device, a coupling member supporting the said sounding device and communicating therewith, a fluid conveying pipe connected with one end of the coupling member, a nozzle located in the coupling member and disposed in line with the conveying pipe and extending past the fluid inlet end of the sounding device, and a collapsible tube operatively connected with the opposite end of the coupling member and adapted to be compressed to permit the fluid from said conveying pipe to be discharged directly to the said sounding device.

2. A signal comprising fluid-controlled alarm means, a fluid-conveying pipe operatively connected with the alarm means, a collapsible tube connected with the said conveying pipe at the discharge end thereof, and a nozzle in the conveying pipe at the point of connection thereof with the said alarm means.

3. A signal comprising a fluid controlled alarm means, a fluid conveying pipe connected therewith and receiving a working fluid, a nozzle located in the said conveying pipe and located directly at the fluid inlet end of the alarm means, and a collapsible tube secured to the discharge end of the fluid conveying pipe.

4. A signal comprising a fluid-controlled sounding device, a coupling member supporting the said device, a fluid-conveying pipe connected with the coupling member and having its bore arranged at right angles to the bore of the coupling member where it connects the said sounding device, a collapsible tube in communication with the coupling member and operable to be compressed to cause the working fluid to operate on the sounding device, and a hollow tapered member located in the coupling member and located immediately at the point of connection of the coupling member with the sounding device.

5. In a signal, a fluid-actuated alarm, a fluid-conveying pipe for the alarm and operable to normally direct the fluid past the alarm, a tapered nozzle located in the pipe at its point of connection with the alarm, and a collapsible member in communication with the conveying pipe.

In testimony whereof I affix my signature in presence of two witnesses.

BARRINGTON FERGUSON.

Witnesses:
   ALEX S. FISHER,
   W. O. FULTON.

---

Copies of this patent may be obtained for five cents each, by addressing the "Commissioner of Patents, Washington, D. C."